United States Patent
Kverel et al.

(10) Patent No.: US 10,557,014 B2
(45) Date of Patent: *Feb. 11, 2020

(54) COMPOSITE MATERIALS INCLUDING INORGANIC FULLERENE-LIKE PARTICLES AND INORGANIC TUBULAR-LIKE PARTICLES IN A POLYMER MATRIX

(71) Applicant: Nanotech Industrial Solutions, Inc., Avenel, NJ (US)

(72) Inventors: Eugene Kverel, New York, NY (US); Ronen Kreizman, Rehovot (IL); George Diloyan, Cranford, NJ (US); Alon Shapira, Givatayim (IL)

(73) Assignee: NANOTECH INDUSTRIAL SOLUTIONS, INC., Avenel, NJ (US)

( * ) Notice: Subject to any disclaimer, the term of this patent is extended or adjusted under 35 U.S.C. 154(b) by 1043 days.

This patent is subject to a terminal disclaimer.

(21) Appl. No.: 14/180,927

(22) Filed: Feb. 14, 2014

(65) Prior Publication Data

US 2014/0231148 A1 Aug. 21, 2014

Related U.S. Application Data

(60) Provisional application No. 61/766,898, filed on Feb. 20, 2013, provisional application No. 61/766,399, filed on Feb. 19, 2013.

(51) Int. Cl.
*B32B 1/02* (2006.01)
*C08K 3/30* (2006.01)
(Continued)

(52) U.S. Cl.
CPC .............. *C08K 3/30* (2013.01); *C08K 7/00* (2013.01); *C10M 125/22* (2013.01);
(Continued)

(58) Field of Classification Search
CPC ....... B32B 1/02; B32B 1/08; Y10T 428/1352; C08K 3/30; C08K 7/00; C08K 3/04;
(Continued)

(56) References Cited

U.S. PATENT DOCUMENTS 6,444,621 B1 * 9/2002 Okaniwa .............. C10M 169/06
508/168
7,018,606 B2 * 3/2006 Tenne .................... B82Y 30/00
423/509

(Continued)

FOREIGN PATENT DOCUMENTS

| RU | 2451861 C2 | 5/2011 |
| WO | WO-9744278 | * 11/1997 |
| WO | 2006123336 A2 | 11/2006 |

OTHER PUBLICATIONS

International Search Report and Written Opinion dated Jun. 10, 2014 for International Appl. No. PCT/US2014/016907.

(Continued)

*Primary Examiner* — Marc A Patterson
(74) *Attorney, Agent, or Firm* — Tutunjian & Bitetto, P.C.

(57) ABSTRACT

A composite including a dispersed phase of an inorganic material of a metal chalcogenide composition with a fullerene-like or tubular-like geometry that is present in a polymeric matrix, wherein the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

16 Claims, 4 Drawing Sheets

(51) Int. Cl.
*C08K 7/00* (2006.01)
*E21B 17/00* (2006.01)
*C10M 125/22* (2006.01)
*C10M 149/14* (2006.01)
*C23C 30/00* (2006.01)
*C25D 15/00* (2006.01)
*C08K 3/04* (2006.01)

(52) U.S. Cl.
CPC ........... *C10M 149/14* (2013.01); *C23C 30/00* (2013.01); *C25D 15/00* (2013.01); *E21B 17/00* (2013.01); *C08K 3/04* (2013.01); *C08K 3/041* (2017.05); *C08K 2003/3009* (2013.01)

(58) Field of Classification Search
CPC . C08K 2003/3009; C08K 3/041; E21B 17/00; C10M 125/22; C10M 149/14; C23C 30/00; C25D 15/00
See application file for complete search history.

(56) References Cited

U.S. PATENT DOCUMENTS

| | | | |
|---|---|---|---|
| 7,510,760 B2 | 3/2009 | Malshe et al. | |
| 8,486,870 B1 | 7/2013 | Malshe | |
| 8,492,319 B2 | 7/2013 | Malshe et al. | |
| 8,827,009 B1 * | 9/2014 | Rankin, III | E21B 7/18 175/107 |
| 9,446,965 B2 * | 9/2016 | Kverel | C01G 1/02 |
| 2002/0182331 A1 | 12/2002 | Oldiges et al. | |
| 2005/0228095 A1 * | 10/2005 | Onishi | C08K 3/01 524/425 |
| 2005/0287348 A1 * | 12/2005 | Faler | B32B 5/18 428/315.5 |
| 2006/0063637 A1 | 3/2006 | Law | |
| 2007/0111319 A1 | 5/2007 | Bastide et al. | |
| 2007/0215360 A1 | 9/2007 | Shuster et al. | |
| 2009/0032499 A1 | 2/2009 | Tenne et al. | |
| 2010/0038142 A1 * | 2/2010 | Snyder | E21B 4/02 175/107 |
| 2010/0068461 A1 * | 3/2010 | Wallace | B81C 1/00111 428/156 |
| 2010/0167968 A1 * | 7/2010 | Pinel | C10M 169/04 508/100 |
| 2011/0082430 A1 * | 4/2011 | Conzone | A61M 5/31513 604/230 |
| 2011/0162751 A1 | 7/2011 | Fitzgerald et al. | |
| 2012/0282456 A1 * | 11/2012 | Sawyer | C10M 169/04 428/327 |
| 2012/0329686 A1 | 12/2012 | Tenne et al. | |
| 2015/0047842 A1 * | 2/2015 | Hoskins | E21B 37/06 166/285 |
| 2016/0199909 A1 * | 7/2016 | Sun | B22F 1/0003 428/553 |

OTHER PUBLICATIONS

International Search Report and Written Opinion dated Jul. 24, 2014 for International Appl. No. No. PCT/US2014/016928.

* cited by examiner

COMPOSITE MATERIALS INCLUDING INORGANIC FULLERENE-LIKE PARTICLES AND INORGANIC TUBULAR-LIKE PARTICLES IN A POLYMER MATRIX

CROSS REFERENCE TO RELATED APPLICATIONS

This application claims the benefit of U.S. Provisional Application No. 61/766,898 filed Feb. 20, 2013, titled "Coating including inorganic fullerene-like particles and inorganic tubular-like particles" and U.S. Provisional Application No. 61/766,399 filed Feb. 19, 2013, titled "Composite materials including fullerene-like hollow particles and inorganic tubular-like particles in a polymer matrix", which are both incorporated herein in their entirety by reference.

FIELD OF THE INVENTION

The present disclosure relates to inorganic particles having a fullerene-like and tubular-like geometry in a polymer matrix.

BACKGROUND

Within the last 15 years, materials and structures showing geometric dimensions, such as diameter, below 100 nm have gained more and more attraction to the scientific world and stimulated spirit of research on ideas for future applications, as well as on serious products for consumer goods, health, medical or food technology.

SUMMARY

In one embodiment of the present disclosure, a composite is provided having a dispersed phase of an inorganic material of a metal chalcogenide composition with a fullerene-like or tubular-like geometry that is present in a polymeric matrix. In one embodiment, the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The inorganic material of the metal chalcogenide having the molecular formula $MX_2$ is present in the polymer matrix in an amount of greater than 0.1 wt %. In some composites, the metal chalcogenide having the molecular formula $MX_2$ is present in the polymer matrix in an amount of greater than 0.01% by volume.

In another embodiment, a drill string for subterranean drilling is provided. In one embodiment, the drill string comprises a rotor and a stator within a casing. The stator is composed of a composite having a dispersed phase of an inorganic material of a metal chalcogenide composition with a fullerene-like or tubular-like geometry that is present in a polymeric matrix. In one embodiment, the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

In yet another embodiment of the present disclosure a drill pipe is provided for insertion into a wellbore produced by subterranean drilling with a drill string. The drill pipe includes a coating on an interior wall of the drill pipe. The coating is composed of a composite having a dispersed phase of an inorganic material of a metal chalcogenide composition with a fullerene-like or tubular-like geometry that is present in a polymeric matrix. In one embodiment, the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen ((J) and combinations thereof.

BRIEF DESCRIPTION OF DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Figure 1:
FIG. 1 is a transmission electron microscope (TEM) image of a metal chalcogenide having a molecular formula $MX_2$ and a fullerene-like geometry, in accordance with one embodiment of the present disclosure.

Detailed embodiments of the present disclosure are described herein however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to 'one embodiment', "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

In one embodiment, a composite is provided having a dispersed phase of an inorganic material of a metal chalcogenide composition with a fullerene-like or tubular-like geometry that is present in a polymeric matrix. A composite is a material composed of two or more distinct phases, e.g., matrix phase and dispersed phase, and having bulk properties different from those of any of the constituents by themselves. As used herein, the term "matrix phase" denotes the phase of the composite that is present in a majority of the composite, and contains the dispersed phase, and shares a load with it. In the present case, the matrix phase may be provided by a polymer. As used herein, the term "dispersed phase" denotes a second phase (or phases) that is embedded in the matrix phase of the composite.

In one example, the matrix phase is provided by an elastomer. An elastomer is a cross-linked, amorphous polymer when above its glass transition temperature. Each of the monomers, which link to form the polymer in an elastomer is usually made of carbon, hydrogen, oxygen and/or silicon. At ambient temperatures, elastomers are relatively soft, e.g., E-3 MPa, and deformable. Elastomers are usually thermosets (requiring vulcanization), but may also be thermoplastic. The long polymer chains cross-link during curing, i.e., vulcanizing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material. Without the cross-linkages or with short, uneasily reconfigured chains, the applied stress would result in a permanent deformation.

Examples of elastomers that are suitable for use with the present disclosure include unsaturated rubbers that can be cured by sulfur vulcanization, which include, but are not limited to natural polyisoprene cis-1,4-polyisoprene natural rubber (NR) and trans-1,4-polyisoprene gutta-percha; synthetic polyisoprene (IR for Isoprene Rubber); polybutadiene (BR for Butadiene Rubber); chloroprene rubber (CR), polychloroprene, neoprene, baypren etc; butyl rubber (copolymer of isobutylene and isoprene, IIR); halogenated butyl rubbers (chioro butyl rubber CIIR; bromo butyl rubber BIIR); styrene-butadiene rubber (copolymer of styrene and butadiene, SBR); nitrile rubber (copolymer of butadiene and acrylonitrile, NBR)(also called Buna N rubbers); hydrogenated nitrile rubbers (HNBR); therban; and zetpol.

In another embodiment, examples of elastomers that are suitable for use with the present disclosure include saturated rubbers that cannot be cured by sulfur vulcanization, which include, but are not limited to EPM (ethylene propylene rubber, a copolymer of ethylene and propylene) and EPDM rubber (ethylene propylene diene rubber, a terpolymer of ethylene, propylene and a diene-component); Epichlorohydrin rubber (ECO); Polyacrylic rubber (ACM, ABR); Silicone rubber (SI, Q, VMQ); Fluorosilicone Rubber (FVMQ); Fluoroelastomers (FKM, and FEPM) Viton, Tecnoflon, Fluorel, Aflas and Dai-El; Perfluoroelastomers (FFKM) Tecnoflon PFR, Kalrez, Chernraz, Perlast; Polyether block amides (PEBA); Chiorosulfonated polyethylene (CSM); Ethylene-vinyl acetate (EVA) and combinations thereof.

Other types of elastomers that are suitable for use with the present disclosure include thermoplastic elastomers (TPE); the proteins resilin and elastin; and polysulfide rubber.

In some embodiments, when an elastomer serves as the matrix of a composite having a dispersed phase of an inorganic material of a metal chalcogenide composition with a fullerene like or tubular-like geometry, the mechanical properties of the composite are greater than the elastomer by itself. For example, the mechanical properties are enhanced, e.g., the slope of the stress-strain curve is increased, in comparison to the elastomer. The composite also has greater lubricating qualities than the elastomer by itself.

Composites including elastomers in accordance with the present disclosure may be used in sealing engagement applications, such as gaskets, vehicle tires, pump housing, anti vibration mountings, etc.

In another embodiment, the polymer that is selected for the matrix of the composite may be an epoxy. Epoxies are typically thermosets. Epoxy resins, also known as polyepoxides are a class of reactive prepolymers and polymers which contain epoxide groups. Epoxy resins may be reacted (cross-linked) either with themselves through catalytic homopolymerisation, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Epoxy compositions that are suitable for use with the present disclosure may include bisphenol A epoxy resin, bisphenol F epoxy resin, novolac epoxy resin, aliphatic epoxy resin, glycidylamine epoxy resin and combinations thereof. One example of the repeating unit for an epoxy that is suitable for use with the present disclosure is a diglycidyl ether of bisphenol A, DGEPA, as follows

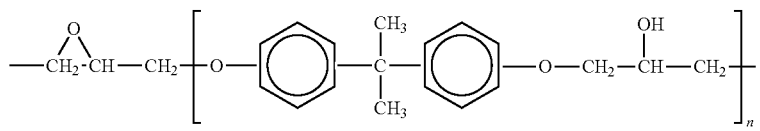

-continued

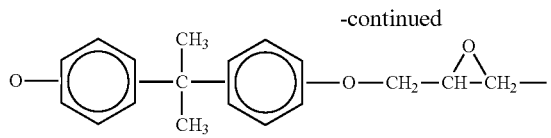

In some embodiments, when an epoxy serves as the matrix of a composite having a dispersed phase of an inorganic material of a metal chalcogenide composition with a fullerene-like or tubular-like geometry, the mechanical properties of the composite are greater than the mechanical epoxy by itself. For example, the peel strength and shear strength performance of a composite of epoxy and the inorganic materials of the metal chalcogenide composition with the fullerene-like or tubular-like geometry is greater than the peel strength and shear strength performance of the epoxy by itself. In some embodiments, the inclusion of the dispersed phase of an inorganic material of the metal chalcogenide composition with the fullerene-like or tubular-like geometry can double the peel strength and shear strength performance of the composite when compared to the epoxy. Energy absorbance, as indicated from the area under the stress-strain curve (e.g. of a tensile test according to ASTM D638) is also increased when compared to epoxy. Impact strength is also increased. Applications for composites including an epoxy based matrix and a dispersed phase of inorganic material having a metal chalcogenide composition, e.g., tungsten disulfide ($WS_2$), and having a fullerene-like and/or tubular-like geometry include adhesives, in addition to structures that employ the epoxy as the matrix of the structures body.

Hardeners for use with the disclosed epoxies may include amine hardeners, such as Jeffamine T-403, TETA, HY 955; amide hardeners, such as Versamide V-x series; sulfide hardeners, such as Capcure 3-800, LP-x series; anhydride hardeners; and accelerators, such as Epon DMP-x series. The above noted hardners are typically suitable for DGEBA. Other hardeners based on a variation of amines may be employed in the epoxy systems.

In another embodiment, the polymer may be a thermoplastic material, such as polyether ether ketone (PEEK) and polypropylene (PP). PEEK polymers are obtained by step-growth polymerization by the dialkylation of bisphenolate salts. When PEEK is employed as the matrix of a composite material including a dispersed phase of inorganic materials of the metal chalcogenide composition with the fullerene-like or tubular-like geometry, the mechanical properties of the composite are greater than the mechanical properties of PEEK without the dispersed phase of inorganic materials. For example, the Young's modulus may be doubled by the inclusion of the dispersed phase of inorganic materials of the metal chalcogenide composition with the fullerene-like or tubular-like geometry into a matrix of PEEK. Impact strength is also increased.

Applications for PEEK in accordance with the present disclosure include medical implants, aerospace structures, automotive structures, bearings, piston parts, pumps, compressor plate valves, and cable insulation.

Polypropylene (PP) is an addition reaction mechanism polymer made from the monomer propylene. Low-density polyethylene (LDPE) and high-density polyethylene (HDPE) are both suitable for use with the present disclosure. PP may be suitable for use as the matrix phase of a composite in accordance with the present disclosure, and is suitable for use in automotive and aerospace applications.

Automotive applications for composites including polypropylene, such as LDPE and HDPE, may include bumpers, fuel lines, door panels and fenders. PP may also be suitable for shielding piping and wire cable sheathing applications. The mechanical properties and impact strength of PP is increased by incorporation of a dispersed phase of inorganic material having a metal chalcogenide composition with a fullerene-like or tubular-like geometry.

In another embodiment, the polymer for the matrix for the composite may be a polyamide. A polyamide is a polymer containing monomers of amides joined by peptide bonds. An amide group has the formula —$CONH_2$. An amide link has this structure

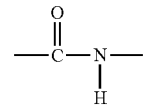

The polyamide polymer may have a high crystallinity, a low crystallinity or may be amorphous. Polyamide polymers that are suitable for use with the present disclosure may be homopolymers or copolymers. The polyamide polymers may aliphatic, semi aromatic, aromatic or a combination thereof.

In one embodiment, the polyamide used for the matrix phase of the polymer composite may be nylon. Nylon may be an aliphatic polymer. In nylon, the repeating units contain chains of carbon atoms. There are various different types of nylon depending on the nature of those chains. Examples of nylons that may be suitable for use as the base material layer of the coating may include nylon-6,6; nylon-6; nylon-6,9; nylon-6,10; nylon-6,12; nylon-11; nylon-12 and nylon-4,6. The repeating unit for nylon-6 is as follows:

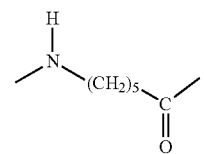

The repeating unit for nylon 6-6 is as follows:

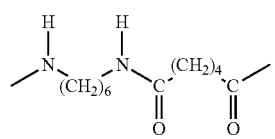

In some embodiments, nylons are condensation copolymers formed by reacting equal parts of a diamine and a dicarboxylic acid, so that amides are formed at both ends of each monomer in a process analogous to polypeptide biopolymers. Chemical elements included are carbon, hydrogen, nitrogen, and oxygen.

In another embodiment, the polyamide for the matrix phase of the polymer composite is kevlar. Kevlar is similar in structure to nylon-6,6 except that instead of the amide links joining chains of carbon atoms together, they join benzene rings.

In another embodiment, the polyamide used for the matrix phase of the composite may be polyphthalamide (aka. PPA, High Performance Polyamide). PPA is a thermoplastic synthetic resin of the polyamide (nylon) family. PPA's are polyamides containing aromatic rings in their backbones, which gives them high mechanical strength and thermal resistance. The term PPA is used when 60% or more moles of the carboxylic acid portion of the repeating unit in the polymer chain is composed of a combination of terephthalic (TPA) and isophthalic (WA) acids. PPA's may be a semi-crystalline material composed from a diacid and a diamine. PPA is typically formed by the reaction of aromatic acids with aliphatic diamines. In some embodiments, the diacid portion contains at least 55% terephthalic acid (TPA) or isophthalic acid (IPA). Molar masses for PPA's made with direct polycondensation techniques range between 12,000 and 16,000 g/mol.

In another embodiment, the polyamide used for the matrix phase of the composite may be a polyphthalamide blend. For example, the matrix of the composite may be composed of at least one of polyphthalamide/polyamide blends and polyphthalamide/polyamide/polyolefin blends.

Other polyamides that are suitable for use as the matrix material of the composite include polyvinyl chloride (PVC), polyester (PES), polyethermide (PEI) and polyphenylene sulfide (PPS).

In some embodiments, the matrix phase of the composite may be provided by polyamide-imides. The polyamide-imides may be thermosetting or thermoplastic amorphous polymers. Polyamide-imide polymers include a polymer chain that comprises amide linkages alternating with imide linkages. The mer unit for one example of a polyamide-imide used in accordance with the present disclosure is as follows:

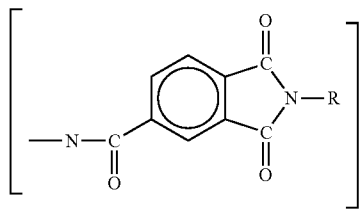

Polyamide-imides may be made from isocyanates and TMA (trimellic acid-anhydride) in N-methylpyrrolidone (NMP). For example, one route to the formation of polyamide-imides is the condensation of an aromatic diamine, such as methylene dianiline (MDA) and trimellitic acid chloride (TMAC). Reaction of the anhydride with the diamine produces an intermediate amic acid. The acid chloride functionality reacts with the aromatic amine to give the amide bond and hydrochloric acid (HCl) as a by-product. In the commercial preparation of polyamideimides, the polymerization is carried out in a dipolar, aprotic solvent such as N-methylpyrrolidone (NMP), dimethylacetamide (DMAC), dimethylformamide (DMF), or dimethylsulfoxide (DMSO) at temperatures between 20-60° C. The byproduct hydrochloric acid (HCl) is typically neutralized in situ or removed by washing it from the precipitated polymer. In another example, polyamide-imides may be formed by reacting diisocyanate, often 4,4'-methylenediphenyldiisocyanate (MDI), with trimellitic anhydride (TMA). Polyamide-imides that are suitable for the methods and structures disclosed herein may be available from Solvay Advanced Polymers under the trademark Torlon, such as Torlon 4301, Torlon ai-10, Torlon ai-10 LM or Torlon 4000. Polyamide-imides (PAI) may be used in conjunction with fluoropolymers.

In some embodiments, the matrix material of the composite may be provided by polyethylene (PE). The term polyethylene describes a family of resins obtained by polymerizing ethylene gas, $H_2C=CH_2$. In some examples, low density polyethylene typically has a density value ranging from 0.91 to 0.925 g/cm$^3$, linear low density polyethylene is in the range of 0.918 to 0.94 g/cm$^3$, while high density polyethylene ranges from 0.935 to 0.96 g/cm$^3$ and above.

In another embodiment, the matrix material of the composite may be cross-linked polyethylene (PEX). Typically, PEX is made from high density polyethylene (HDPE). Cross linked polyethylene (PEX) contains cross-linked bonds in the polymer structure, changing the thermoplastic to a thermoset. In one embodiment, in order to be classified as being cross linked polyethylene (PEX), the required degree of cross-linking, according to ASTM Standard F 876-93, is between 65% and 89%.

In yet another embodiment, the polymer for the composite may be a polyester. Polyester is a category of polymers which contain the ester functional group in their main chain. In some examples, polyester that is suitable for the composite may include polybutylene terephthalate (PBT) and polyethylene terephthalate (PET). The repeating unit of polybutylene terephthalate (PBT) is as follows

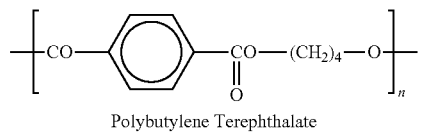

Polybutylene Terephthalate

The repeating unit of polyethylene terephthalate (PET) is as follows

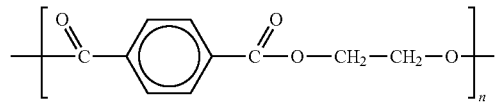

Polyesters are synthesized by reacting an organic acid, in this case terephthalic acid, with an alcohol. In the case of polybutylene terephthalate (PBT), the alcohol is generically referred to as butylene glycol, while in polyethylene terephthalate (PET) it is ethylene glycol. The resulting polymers are known, therefore, as polybutylene terephthalate (PBT) and polyethylene terephthalate (PET).

Other polymers that are suitable for use as the matrix phase of the composite include polyvinyl chloride (PVC), polyester (PES), polyamides (PA), polyethermide (PEI) and polyphenylene sulfide (PPS). PVC is suitable for shielding and piping applications. PES is suitable for use in fiber and textile applications; and PA is suitable fibers, toothbrush bristles, and car engine moldings. PEI and PPS are high temperature polymers. The structural properties of PVC, PES, PA, PEI and PPS may all be enhanced by incorporation of a dispersed phase of inorganic material having a metal chalcogenide composition with a fullerene-like or tubular-like geometry, in accordance with the present disclosure.

The dispersed phase of the inorganic material having the metal chalcogenide composition typically has a fullerene-like and/or tubular-like geometry. As used herein, the term "inorganic fullerene-like" denotes a sphere like geometry. The sphere like geometry may have a core that is hollow, have a solid core, or have an amorphous core. A fullerene like geometry may also be referred to as having a cage geometry. More specifically, in some embodiments, an inorganic material having the metal chalcogenide composition with a fullerene like geometry may be a cage geometry that is hollow at its core and layered at its periphery. For example, the inorganic material having the metal chalcogenide composition and the fullerene like geometry may be a single layer or double layered structure. The inorganic material having the metal chalcogenide composition and the fullerene like geometry is not limited on only single layer or double layered structures, as the inorganic material may have any number of layers. These structures are also referred to in the art as being "nested layer structures".

One example of an inorganic material having the metal chalcogenide composition and the is depicted in FIG. 1. FIG. 1 depicts a transmission electron microscope (TEM) image of an inorganic material having a tungsten disulfide ($WS_2$) composition with a fullerene-like geometry. In another example, the inorganic material having the metal chalcogenide composition and the inorganic fullerene like geometry is composed of molybdenum disulfide ($MoS_2$). It is noted that the inorganic material with the fullerene like geometry that is depicted in FIG. 1 is not limited to only tungsten disulfide ($WS_2$) and molybdenum disulfide ($MoS_2$). Inorganic materials with a metal chalcogenide composition and having a fullerene-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The inorganic material having the metal chalcogenide composition and fullerene-like geometry may have a diameter ranging from 1 nm to 15 µm. In another embodiment, the inorganic material having the metal chalcogenide composition and the fullerene-like geometry may have a diameter ranging from 2 nm to 10 µm. In yet another embodiment, the inorganic material having the metal chalcogenide composition and the fullerene-like geometry may have a diameter ranging from 5 nm to 15 µm. The inorganic material having the metal chalcogenide composition and the fullerene-like geometry may have a diameter that is any value within the above ranges. It is noted that the above dimensions are provided for illustrative purposes only, and are not intended to limit the present disclosure.

As used herein, the term "tubular-like geometry" denotes a columnar or cylindrical geometry. In some embodiments, an inorganic material having the metal chalcogenide composition and the tubular-like geometry may be a cage geometry that is hollow at its core and layered at is periphery. In other embodiments, the core may be solid or be amorphous. For example, the inorganic material having the metal chalcogenide composition and the tubular-like geometry may be a single layer or double layered structure. These structures are also referred to in the art as being "nested layer structures".

Figure 2:
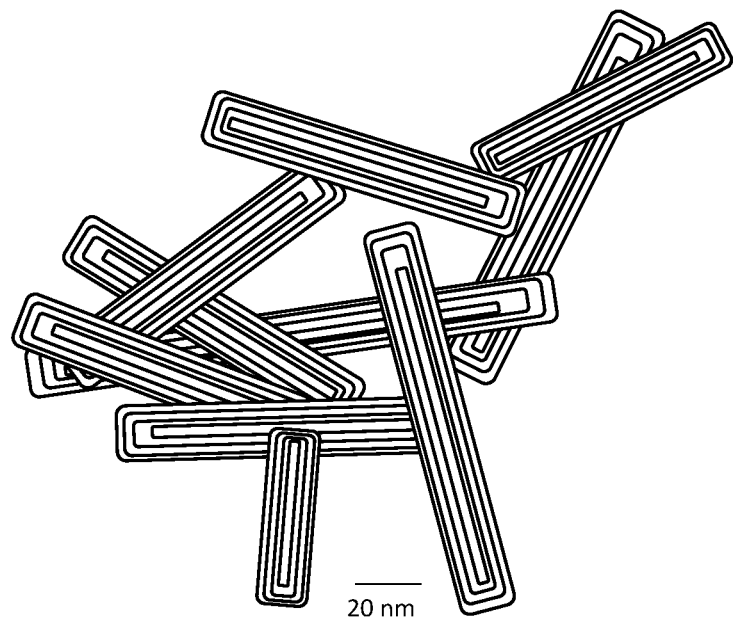
FIG. 2 is a transmission electron microscope (TEM) image of a metal chalcogenide having a molecular formula $MX_2$ and a tubular-like geometry, in accordance with one embodiment of the present disclosure.

One example of an inorganic material having the metal chalcogenide composition and the tubular-like geometry is depicted in FIG. 2. FIG. 2 depicts a transmission electron microscope (TEM) image of an intercalation compound having a tungsten disulfide ($WS_2$) composition with an inorganic tubular-like geometry. In another example, the inorganic material having the metal chalcogenide composition and the tubular-like geometry is composed of molybdenum disulfide ($MoS_2$). It is noted that the inorganic material having the metal chalcogenide composition and the tubular-like geometry that is depicted in FIG. 2 is not limited to only tungsten disulfide ($WS_2$) and molybdenum disulfide ($MoS_2$). Inorganic materials having a tubular-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), and combinations thereof, and X is a chalcogen element selected from the group consisting of sulfur (S), selenium (Se), tellurium (Te) and oxygen (O).

The inorganic materials having the metal chalcogenide composition and the tubular-like geometry may have a diameter, i.e., distance perpendicular to the greatest axis of the tubular-like geometry, ranging from 1 nm to 300 nm. In another embodiment, the inorganic materials having the metal chalcogenide composition and the tubular-like geometry may have a diameter ranging from 5 nm to 125 nm. In yet another embodiment, the inorganic materials having the metal chalcogenide composition and the tubular-like geometry with a diameter ranging from 10 nm to 100 nm. The inorganic materials having the metal chalcogenide composition and the tubular-like geometry may have a length, i.e., greatest axis of the tubular-like geometry, that ranges from 1 nm to 20 cm. In another embodiment, the inorganic materials having the metal chalcogenide composition and the tubular-like geometry may have a length, i.e., greatest axis of the tubular-like geometry, that ranges from 5 nm to 15 cm. In yet another embodiment, the inorganic materials having the metal chalcogenide composition and the tubular-like geometry may have a length, i.e., greatest axis of the tubular-like geometry, that ranges from 100 nm to 10 cm. The inorganic materials having the metal chalcogenide composition and the tubular-like geometry may have a length or diameter that is any value within the above ranges. It is noted that the above dimensions are provided for illustrative purposes only, and are not intended to limit the present disclosure.

The inorganic materials having the metal chalcogenide composition, e.g., $WS_2$, and the fullerene-like geometry and/or tubular-like geometry may be produced via sulfidization of tungsten oxide nanoparticles in reduction atmosphere in fluidized bed reactor. The inorganic materials having the metal chalcogenide composition and the fullerene-like geometry and/or tubular-like geometry may be formed in accordance with at least one of the methods disclosed in U.S. Pat. Nos. 6,217,843, 6,710,020, 6,841,142, 7,018,606 and 7,641,886, which are each incorporated herein in their entirety. It is noted that the methods disclosed in the aforementioned patents are only some examples of methods that are suitable for forming the inorganic materials having the metal chalcogenide composition and the fullerene-like and/or tubular-like geometry. Any method may be employed for forming the above-described inorganic materials having the metal chalcogenide composition, so long as the compound formed has a fullerene-like and/or tubular-like geometry.

In some embodiments, the inorganic materials having the metal chalcogenide composition and the fullerene-like and/or tubular-like geometry may be present in the polymer matrix in an amount greater than 0.01% by volume. In some embodiments, the inorganic materials having the metal chalcogenide composition and the fullerene-like and/or tubular-like geometry may be present in the polymer matrix in an amount ranging from 0.1 wt to 60 wt. %. In another embodiment, the inorganic materials having the metal chalcogenide composition and the fullerene-like and/or tubular-like geometry may be present in the polymer matrix in an amount ranging from 0.1 wt % to 20 wt. %. In yet another embodiment, the inorganic materials having the metal chalcogenide composition and the fullerene-like and/or tubular-like geometry may be present in the polymer matrix in an amount ranging from 0.1 wt % to 10 wt. %.

In some embodiments, the composite structure may include a second dispersed phase of a carbon containing material, such as carbon nanotubes, e.g., single wall carbon nanotubes (CNT) or multi-wall carbon nanotubes (SWNT), or graphitic materials, such as carbon black (CB), graphitic fibers, diamond like carbon (DLC). The second dispersed phase of carbon containing materials could be used in polymer matrices for reinforcement or in order to obtain desired physical, chemical or mechanical properties.

In one embodiment, the carbon containing material is provided by carbon nanotubes that may have a high purity on the order of about 95% to about 99% carbon. In an even further embodiment, the carbon nanotubes have a high purity on the order of about 99% or greater. In one embodiment, the carbon nanotubes may be provided by laser vaporization. In one embodiment, the single wall carbon nanotubes are formed using laser vaporization in combination with a catalyst, such as a metal catalyst. In one embodiment, the catalyst is supported on a substrate, such as a graphite substrate, or the catalyst may be floating metal catalyst particles. In one embodiment, the metal catalyst may be composed of Fe, Ni, Co, Rh, Y or alloys and combinations thereof.

The diameter of a single wall carbon nanotube may range from about 1 nanometer to about 400 nanometers. In another embodiment, the diameter of a single wall carbon nanotube may range from about 1.2 nanometers to about 1.6 nanometers. In one embodiment, the nanotubes used in accordance with the present invention have an aspect ratio of length to diameter on the order of approximately 200:1.

The carbon nanotubes comprise a majority of carbon typically being of high purity. In other examples, the carbon nanotubes include a carbon content ranging from being greater than 50%, wherein a purification process is utilized to provide carbon nanotubes having of high purity, such as greater than 90% carbon. In one embodiment, the carbon nanotubes may be purified by a process that includes an acid treatment followed by an oxidation. In one embodiment, the acid treatment may include treatment and oxidation steps are provided by a dilute $HNO_3$ reflux/air oxidation procedure.

Other methods of forming the carbon nanotubes may also be employed, such as chemical vapor deposition (CVD). In another embodiment, the carbon nanotubes may be multi-walled. Carbon black (also known as acetylene black, channel black, furnace black, lamp black or thermal black) is also suitable for providing the at least one carbon containing nanomaterial. Carbon black is a material produced by the incomplete combustion of heavy petroleum products such as FCC tar, coal tar, ethylene cracking tar, and a small amount from vegetable oil.

In some embodiments, the carbon containing material may be present in the polymer matrix in an amount ranging from 0.1 wt. % to 60 wt. %. In another embodiment, the carbon containing material may be present in the polymer matrix in an amount ranging from 0.1 wt. % to 40 wt. %. In yet another embodiment, the carbon containing material in the polymer matrix in an amount ranging from 0.1 wt % to 30 wt. %.

The process of obtaining homogeneous mix of inorganic fullerene-like and/or tubular particles with carbon containing materials may begin with premixing the inorganic material having the metal chalcogenide composition and the fullerene-like and/or tubular-like geometry with the carbon containing material. In one embodiment, the premixing step may be done by dry mixing, in another embodiment, the premixing step may employ a solvent as a mixing media, such as alcohol. Examples of mixing media that are suitable for mixing the inorganic material having the metal chalcogenide composition and the fullerene-like and/or tubular-like geometry with the carbon containing materials include an alcohol, such as methyl alcohol, ethyl alcohol, isopropyl alcohol, propanol, butanol, hexanol, heptanol, octanol, ethylene glycol, glycerol and combinations thereof. In another embodiment, the mixing media may be an inert solvent.

The polymer may then be added to the premixture of the inorganic fullerene-like and/or tubular particles with carbon containing materials. The polymer may be any precursor for providing the above described polymer compositions. In some examples, the monomer/polymer may be selected from the group consisting of ethylene, propylene, homopolymers, copolymers thereof with alpha-olefins, conjugated alpha-diolefins, styrene, cycloalkenes, norbornene, norbornadiene, cyclopentandiene, elastomer type of polymer and mixtures thereof. Mixing procedures could be conducted using at least one of high shear mixers, two or three roll mixers, homogenizers, bead mills, ultrasonic pulverizer, ribbon blender, v blender, continuous processor, cone screw blender, double planetary, counter-rotating, vacuum mixer, dispersion mixer, magnetic stirrers and variations thereof in combination with or without elevated temperature to the value of polymer melting point. In some embodiments, when alcohol is used as a mixing media, it should be evaporated prior to adding the polymer. The mixture may then be fed into an extruder to the form the polymer.

In one example, the inorganic material having the metal chalcogenide composition, e.g., tungsten disulfide $WS_2$, with the fullerene-like and/or tubular-like geometry is incorporated into the thermoplastic polymer, e.g., nylon, PE, PP, to improve the polymers mechanical properties (e.g. toughness), and/or its tribological properties. These materials can be used either as matrices in composites, and as stand-alone polymers.

The product may be provided as a granulated compound containing the metal chalcogenide composition, e.g., tungsten disulfide $WS_2$, with the fullerene-like and/or tubular-like geometry inside a matrix of thermoplastic polymers, e.g., nylons, PE, PP. The compounding can be provided by direct mixing of powder, e.g., tungsten disulfide $WS_2$, with twin-screw extruder. In another example, the compounding can be achieved by dispersion in a plasticizer compatible to the polymer by high shear mixer or stirred bead mill, and then incorporation to the compound by twin-screw extruder.

Extrusion is only one way to form a composite product in accordance with the present disclosure. For example, composite structures may be formed using molding methods. In one example, a composite structure including a polymeric matrix and a dispersed phase of the inorganic material having the metal chalcogenide composition, e.g., tungsten disulfide ($WS_2$), and having a fullerene-like and/or tubular-like geometry may be formed using injection molding. In injection molding, a composite precursor including the polymeric matrix and a dispersed phase of the inorganic material having the metal chalcogenide composition, e.g., tungsten disulfide ($WS_2$), and having a fullerene-like and/or tubular-like geometry is melted and forced into a mold cavity. The mold cavity has the geometry for the composite structure. Once cooled, the melted composite precursor solidifies in the form of the geometry defined by the mold, and the mold can be removed. In another embodiment, the composite structure may be formed using blow molding. Blow molding is like injection molding except that hot liquid precursor composite material pours out of a barrel vertically in a molten tube. The mold closes on it, and forces it outward to conform to the inside shape of the mold. When it is cooled, a hollow geometry is formed for the composite structure. In another embodiment, the composite product of the polymer matrix and the dispersed phase of the inorganic material having the metal chalcogenide composition, e.g., tungsten disulfide ($WS_2$), and having a fullerene-like and/or tubular-like geometry may be formed using compression molding. In this type of plastic molding, a slug of hard plastic, i.e., slug of solidified composite precursor including the polymeric matrix and a dispersed phase of the inorganic material having the metal chalcogenide composition, e.g., tungsten disulfide ($WS_2$), and having a fullerene-like and/or tubular-like geometry, is pressed between two heated mold halves. Compression molding usually uses vertical presses instead of the horizontal presses used for injection and blow molding. The parts of the composite material that are formed are then air-cooled. In other examples, composite parts may be formed using rotational molding, structural foam molding, thermoforming, film insert molding, gas assist molding and combinations thereof.

Figure 3:
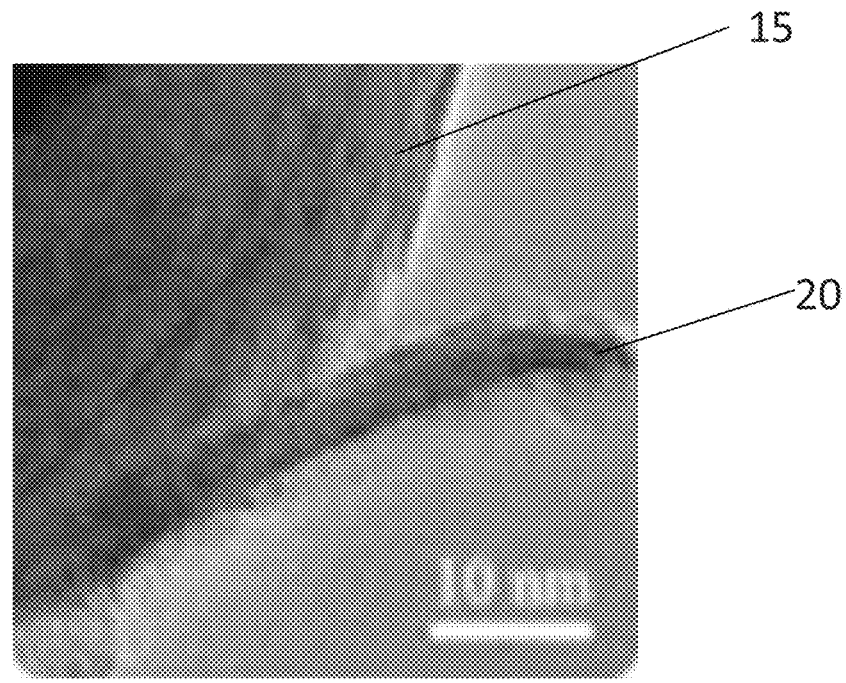
FIG. 3 is a transmission electron microscope (TEM) image of a multi-layered nanosphere of metal chalcogenide having a molecular formula $MX_2$ with a fullerene-like geometry under a stress that exfoliates tribofilm lamellas, in accordance with one embodiment of the present disclosure.

In some embodiments, continuous friction applied to a metal chalcogenide of tungsten disulfide ($WS_2$) having a fullerene like geometry 15 will exfoliate the outer layers of material, as depicted in FIG. 3, onto a frictional surface that is applying pressure to the tungsten disulfide material, wherein the exfoliating outer layers create a tribofilm layer 20. A "tribofilm" is defined as a thin solid film generated as a consequence of sliding contact, which is adhered on a contacting, i.e., frictional, surface, but has different chemical composition, structure and tribological behavior than the contacting surface. The exfoliated nano-particle layers accumulate in wear crevices in the surfaces that the tribofilm layer 20 comes in contact with, creating a continuous super-lubricating tribofilm layer 20. The exfoliated tribofilm layers from the metal chalcogenide of the coating may be referred to as lamellas. The lamellas orient parallel to the deposition surface in the direction of the frictional motion. Even between highly loaded stationary surfaces the lamellar structure is able to prevent contact. Therefore, in some embodiments, the composite structures disclosed herein may induce lubricating properties on surfaces that they come in contact with the composite structures, wherein the composite structures contain the metal chalcogenide having the fullerene like geometry, e.g., tungsten disulfide, that can exfoliate outer layers of the layered structure to provide tribofilms.

In some embodiments, the tirbofilm layer that may be exfoliated from the layered fullerene geometry metal chalcogenide, e.g., $WS_2$, of the composite provides a damping effect to absorb shock between the surface that the tribofilm layer is formed on an a second surface that the tribofilm layer contacts. The particles, being closed-cage, absorb pressure. Additionally, in the direction of motion the lamellas of the tribofilm layer easily shear over each other resulting in a low friction. The lubricating tribofilm layer repairs wear damage, prevents further wear, reduces the coefficient of friction and reduces the local temperature.

Figure 4:
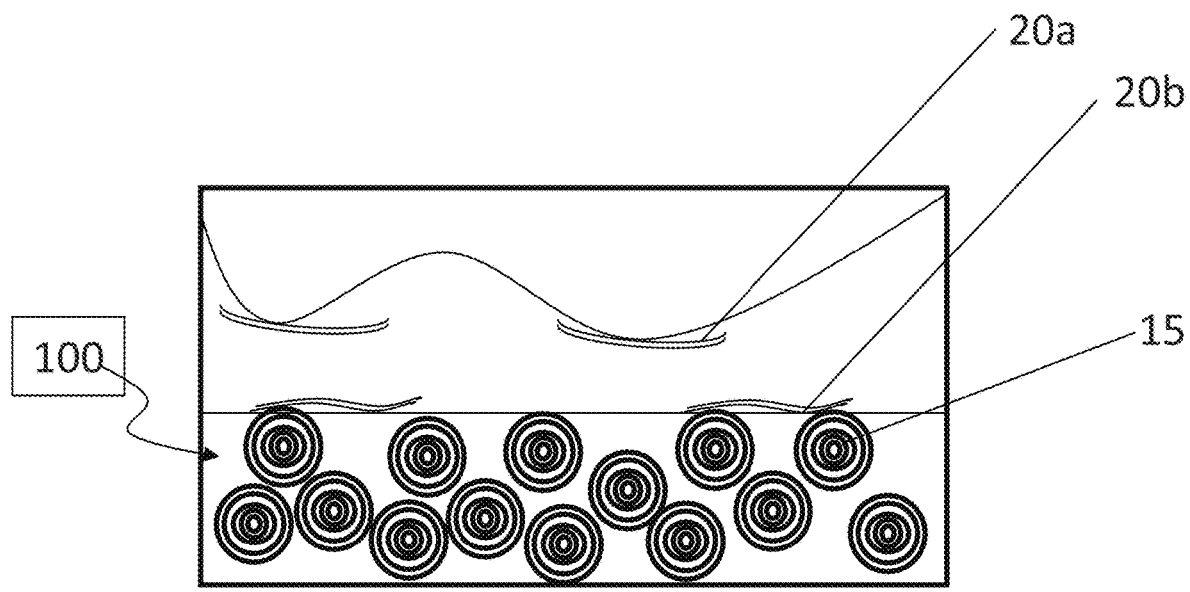
FIG. 4 is an illustration depicting the application of a friction force to a composite structure including a polymeric matrix and a dispersed phase of metal chalcogenide having a molecular formula $MX_2$ and a fullerene-like geometry, in accordance with one embodiment of the present disclosure.

Referring to FIG. 4, a composite 100 of a polymeric matrix containing a dispersed phase of metal chalcogenide with a fullerene like or tubular-like geometry 15, e.g., tungsten disulfide $WS_2$, is depicted adjacent to a frictional surface 16. The composite 100 including the chalcogenide of tungsten disulfide ($WS_2$) having a fullerene like geometry 15 creates a tribofilm 20a of exfoliated material of metal chalcogenide, e.g., tungsten disulfide $WS_2$, with a fullerene like or tubular-like geometry 15 on the frictional surface 16 contacting the composite structure 100. Further, exfoliated material of metal chalcogenide, e.g., tungsten disulfide $WS_2$, with a fullerene like or tubular-like geometry 15 from the composite structure 100 can create a fresh tribofilm 20b on the composite 100 itself. Consequently, the coefficient of friction for the composite structure 100 is constantly low.

Another advantage of the composite of the polymeric matrix containing the dispersed phase of metal chalcogenide with a fullerene like or tubular-like geometry 15, e.g., tungsten disulfide $WS_2$, is the shock wave resistance of the nanostructures. For example, the shock-wave resistance of $WS_2$ nanotubes has been studied and compared to that of carbon nanotubes, in which it has been determined that $WS_2$ nanotubes are capable of withstanding shear stress caused by shock waves of up to 21 GPa. Under similar shock conditions, $WS_2$ tubes are more stable than carbon nanotubes, the latter being transformed into a diamond phase. In some embodiments, the supershock-absorbing ability of the IF-$WS_2$ enables them to survive pressures up to 25 GPa accompanied with concurrent temperatures of up to 1000° C. without any significant structural degradation or phase change. IF-$WS_2$ are stable in air at temperatures higher than 400° C.

In another aspect of the present disclosure, the composite having the dispersed phase of the metal chalcogenide with a fullerene-like and/or tubular-like geometry that is present in a polymeric matrix may be employed as the stator of a drill string for subterranean drilling. In one embodiment, a "drill string" is a column, or string, of drill pipe that transmits drilling fluid and torque to the drill bit. Positive Displacement Motors (PDMS) are known in the art and are commonly used to drill wells in earth formations. PDMs operate according to a reverse mechanical application of the Moineau principle, wherein pressurized fluid is forced through a series of channels formed on a rotor and a stator. The channels are generally helical in shape and may extend the entire length of the rotor and stator. The passage of the pressurized fluid generally causes the rotor to rotate within the stator. For example, a substantially continuous seal may be formed between the rotor and the stator, and the pressurized fluid may act against the rotor proximate the sealing surfaces so as to impart rotational motion on the rotor as the pressurized fluid passes through the helical channels.

Figure 5:
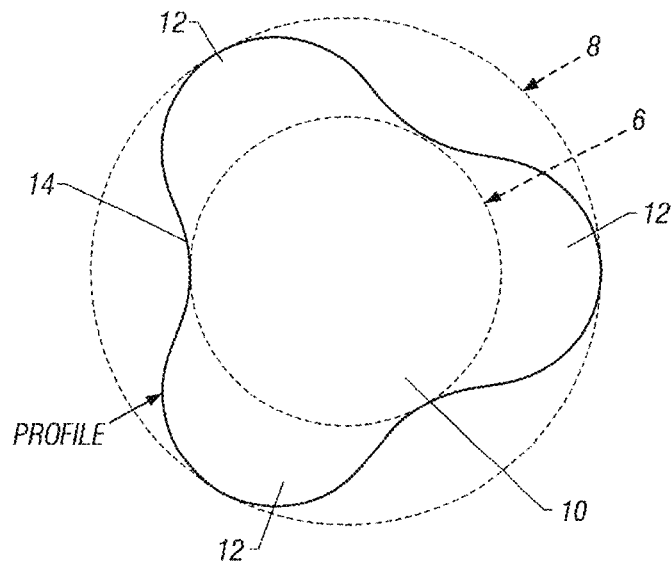
FIGS. 5, 6 and 7 are cross-sectional top down view of a drilling string having a stator composed of a composite having a dispersed phase of an inorganic material of a metal chalcogenide composition with a fullerene-like or tubular-like geometry that is present in a polymeric matrix, in accordance with one embodiment of the present disclosure.
Figure 6:
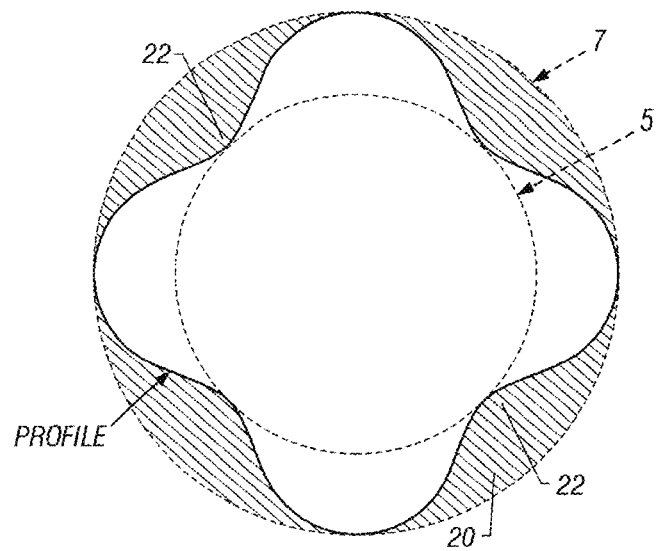
Figure 7:
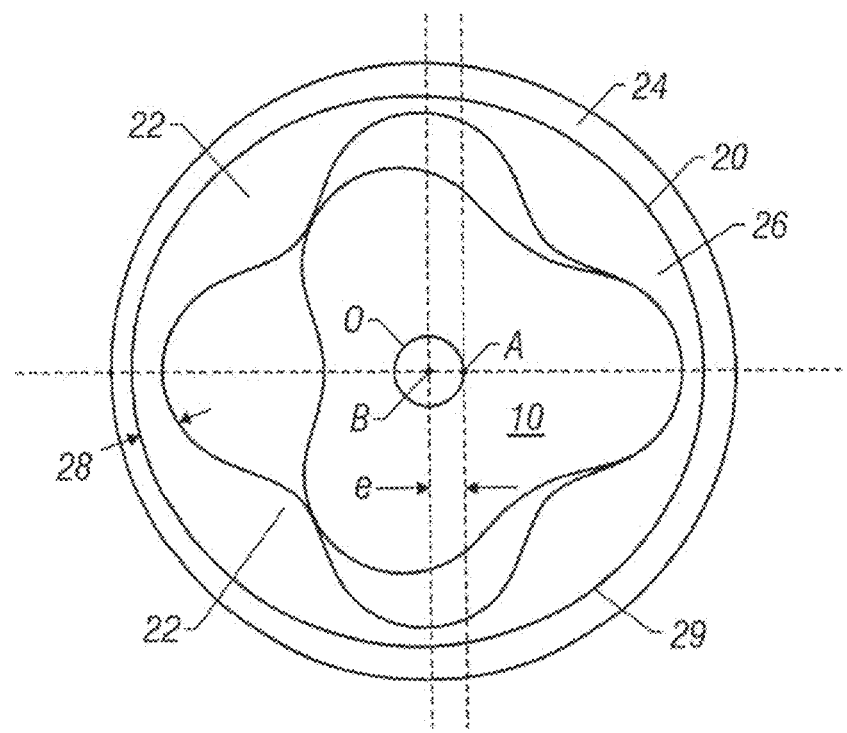

Referring to FIG. 5, a typical rotor 10 includes at least one lobe 12 (wherein, for example, channels 14 are formed between lobes 12), a major diameter 8, and a minor diameter 6. The rotor 10 may be formed of metal or any other suitable material. The rotor 10 may also be coated to withstand harsh drilling environments experienced downhole. Referring to FIG. 6, a typical stator 20 comprises at least two lobes 22, a major diameter 7, and a minor diameter 5. Referring to FIG. 7, the stator 20 generally includes a cylindrical external tube 24, i.e., casing, and a liner 26. The liner 26 of the stator 20 may be composed of a composite having a dispersed phase of an inorganic material of a metal chalcogenide composition with a fullerene-like and/or tubular-like geometry that is present in a polymeric matrix. In one embodiment, the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The above description of the composite having a dispersed phase of an inorganic material of a metal chalcogenide composition with a fullerene-like or tubular-like geometry that is present in a polymeric matrix is suitable for the description of the composite for the liner 26 of the strator 20. For example, the inorganic material of the metal chalcogenide having the molecular formula $MX_2$ is present in the polymer matrix in an amount of greater than 0.01% by volume for the material of the liner 26. The liner 26 is typically injected into the cylindrical external tube 24 around a mold (not shown) that has been placed therein. The liner 26 is then cured for a selected time at a selected temperature (or temperatures) before the mold (not shown) is removed.

By forming the liner 26 of the stator 20 with the composite having the dispersed phase of inorganic materials of the metal chalcogenide composition with fullerene-like or tubular-like geometry that is present in a polymeric matrix, the strength and lubricity of the liner 26 for the stator 20 is increased. In some embodiments, the polymer matrix that is employed in the liner 26 of the stator 20 is composed of an elastomer. Any of the above-described elastomers are suitable to provide the matrix phase of the composite for the liner 26 of the stator 20.

Figure 8:
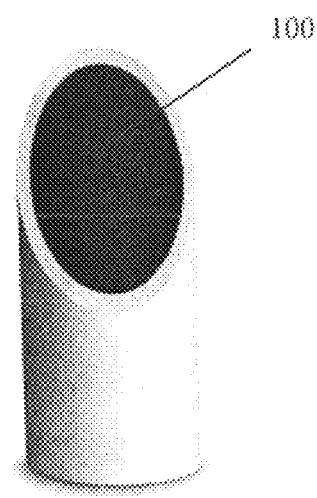
FIG. 8 is a perspective view of a drill pipe includes a coating on an interior wall of the drill pipe that is composed of a composite having a dispersed phase of an inorganic material of a metal chalcogenide composition with a fullerene-like or tubular-like geometry that is present in a polymeric matrix, in accordance with one embodiment of the present disclosure

In yet another embodiment, a drill pipe is provided that includes a coating 100 on an interior wall of the drill pipe that is composed of a composite having a dispersed phase of an inorganic material of a metal chalcogenide composition with a fullerene-like or tubular-like geometry that is present in a polymeric matrix, as depicted in FIG. 8. A drill pipe is a hollow thick-walled steel piping that is used in drilling rigs and horizontal drilling to facilitate drilling of a wellbore. They are hollows to allow drilling fluid to be pumped through them, down the hole and then back up to the surface. The coating 100 is composed of a composite having a dispersed phase of an inorganic material of a metal chalcogenide composition with a fullerene-like or tubular-like geometry that is present in a polymeric matrix. In one embodiment, the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The above description of the composite having a dispersed phase of an inorganic material of a metal chalcogenide composition with a fullerene-like or tubular-like geometry that is present in a polymeric matrix is suitable for the description of the composite material of the coating 100. For example, the inorganic material of the metal chalcogenide having the molecular formula $MX_2$ is present in the polymer matrix for the coating 100 in an amount of greater than 0.01% by volume. With fullerene-like or tubular-like geometry that is present in the coating composite, the strength and lubricity of the coating 100 for the drill pipe is increased.

The following examples are provided to further illustrate the present invention and demonstrate some advantages that arise therefrom. It is not intended that the invention be limited to the specific examples disclosed.

EXAMPLES

This following example details the stages involved in one embodiment for the preparation of a dispersion for forming a composite including a polymeric matrix and a dispersed phase of the inorganic material having the metal chalcogenide composition, e.g., tungsten disulfide ($WS_2$), and having a fullerene-like and/or tubular-like geometry. In some examples, the dispersed phase of the inorganic material having the metal chalcogenide composition, e.g., tungsten disulfide ($WS_2$), improves the polymers mechanical properties (e.g. toughness), and/or its tribological properties. The epoxy of the present example, may be employed as a matrixes for composites and as an adhesive, but other applications have been contemplated.

The method may begin with the formation of a dispersion. The dispersion was formed in a stirred bead mill, such as a stirred bead mill produced by WAB. The media to form the dispersion may be stirred in a vessel, and pumped into a closed chamber with $ZrO_2$ beads that stir at a high velocity. The grinded media may be circulated and stirred from between the chamber and the vessel of the stirred bead mill. It is noted that the dispersion may also be formed in a high-shear mixer, such as a high speed mixer sold under the tradename DISPERMAT® by VMA-GETZMANN GMBH.

The epoxy additive was comprised of the following materials, as included in Table 1

TABLE 1

| Material | Percentage (by weight) |
| --- | --- |
| 815 (DGEBA resin diluted with butyl-glycidyl-ether) | 80.0 |
| Tungsten disulfide ($WS_2$) | 20.0 |

Manufacturing of the dispersion included weighing the epoxy resin, i.e., DGEBA resin diluted with butyl-glcidyl-ether, and tungsten disulfide $WS_2$ into a vessel. The composition, i.e., epoxy resin, i.e., DGEBA resin diluted with butyl-glcidyl-ether, and tungsten disulfide $WS_2$, was then mixed at low speeds. Thereafter, the composition was fed into the stirred bead mill and run for approximately 4 hours to form the dispersion. The dispersion was then collected from the vessel of the stirred bead mill and stored in a tin can.

Application of the dispersion can vary base on application, in which the concentration of the additive typically has to be determined for the specific application. Incorporation of the additive to the neat epoxy resin can be done with a high-shear mixer.

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:

1. A composite comprising:
a dispersed phase of an inorganic material of a metal chalcogenide composition with a fullerene like or tubular-like geometry having a diameter ranging from 1 nm to 300 nm that is present in a polymeric matrix, wherein the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, the fullerene like or tubular-like geometry being a multilayered structure having an outer layer comprising at least one sectioned portion, the at least one sectioned portion extending along a direction away from the curvature of the multilayered structure, the at least one sectioned portion engaged to a remaining section of the outer layer, the composite being a structural molded or extruded product having a rigid body, wherein the matrix providing a majority by volume of the rigid body for the structural molded or extruded product, the composite including at least one friction surface, wherein the friction surface making sliding contact in a friction event provides for exfoliating inorganic material of the metal chalcogenide composition with the fullerene like or the tubular-like geometry providing lubricating material, wherein as the friction surface wears additional amounts of the dispersed phase of the fullerene like or tubular-like geometry are exposed and additional amounts of said lubricating material is provided to contribute to a tribofilm lubricating layer on the friction surface from the at least one sectioned portion of the dispersed phase multilayered structure that are present at the friction surface of the composite.

2. The composite of claim 1, wherein the inorganic material of the metal chalcogenide having the molecular formula $MX_2$ is present in the polymer matrix in an amount of greater than 0.01% by volume.

3. The composite of claim 1, wherein the polymer matrix has a composition selected from the group consisting of elastomers, epoxies, thermoplastic polymers, polyamides, polyphthalamide, polyphthalamide blend, poly-amide-imide, polyethylene, cross-linked polyethylene, polyester, polyurethanes, polyproplenes, and combinations thereof.

4. The composite of claim 1, further comprising a carbon containing structure selected from the group consisting of a single wall carbon nanotube, a multi-wall carbon nanotube, graphite, carbon black, diamond like carbon (DLC) and a combination thereof.

5. The composite of claim 1, wherein the inorganic material of the metal chalcogenide having the molecular formula $MX_2$ is tungsten disulfide ($WS_2$), molybdenum disulfide ($MoS_2$) or a combination thereof.

6. The composite of claim 1, wherein the inorganic material of the metal chalcogenide having the molecular formula $MX_2$ is a particle having a tube-like geometry and a length ranging from 10 nm to 15 cm.

7. A drilling string comprising:
a rotor and a stator within an external casing, the stator being entirely composed of a composite having a dispersed phase of an inorganic material of a metal chalcogenide composition with a fullerene-like or tubular-like geometry having a diameter ranging from 1 nm to 300 nm that is present in a polymeric matrix, wherein the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, the fullerene-like or tubular-like geometry being a multilayered structure having an outer layer comprising at least one sectioned portion, the at least one sectioned portion extending along a direction away from the curvature of the multilayered structure, the at least one sectioned portion engaged to a remaining section of the outer layer, wherein the strator includes at least one friction surface, wherein the friction surface making sliding contact in a friction event provides for exfoliating inorganic material of the metal chalcogenide composition with the fullerene like or the tubular-like geometry providing lubricating material, wherein as the friction surface wears additional amounts of the dispersed phase are exposed and additional amounts of said lubricating material is provided.

8. The drilling string of claim 7, wherein the inorganic material of the metal chalcogenide having the molecular formula $MX_2$ is present in the polymer matrix in an amount of greater than 0.1% by volume.

9. The drilling string of claim 7, wherein the polymer matrix has a composition selected form the group consisting of elastomers, epoxies, thermoplastic polymers, polyamides, polyphthalamide, polyphthalamide blend, poly-amide-imide, polyethylene, cross-linked polyethylene, polyester, polyurethanes, polyproplenes, and combinations thereof.

10. The drilling string of claim 7, further comprising a carbon containing structure selected from the group consisting of a single wall carbon nanotube, a multi-wall carbon nanotube, graphite, carbon black, diamond like carbon (DLC) and a combination thereof.

11. The drilling string of claim 7, wherein the inorganic material of the metal chalcogenide having the molecular formula $MX_2$ is tungsten disulfide ($WS_2$), molybdenum disulfide ($MoS_2$) or a combination thereof.

12. The drilling string of claim 7, wherein the inorganic material of the metal chalcogenide having the molecular formula $MX_2$ is a particle having a tube-like geometry and has a length ranging from 10 nm to 15 cm.

13. The composite of claim 1, wherein an elongation for the composite is approximately 3 MPa or greater.

14. The composite of claim 1, wherein the composite is an automotive structural component, an aerospace structural component or a combination thereof.

15. The composite of claim 1, wherein the composite is a bearing.

16. The composite of claim 1, wherein the fullerene like or tubular-like geometry has a solid core.

* * * * *